US010525796B2

(12) United States Patent
Sawada et al.

(10) Patent No.: US 10,525,796 B2
(45) Date of Patent: Jan. 7, 2020

(54) REGISTER FIXING STRUCTURE FOR A VEHICLE

(71) Applicant: TOYOTA JIDOSHA KABUSHIKI KAISHA, Toyota-shi, Aichi-ken (JP)

(72) Inventors: Naoki Sawada, Toyota (JP); Toshinao Wada, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 217 days.

(21) Appl. No.: 14/802,657

(22) Filed: Jul. 17, 2015

(65) Prior Publication Data
US 2016/0039270 A1 Feb. 11, 2016

(30) Foreign Application Priority Data
Aug. 8, 2014 (JP) .................................. 2014-162741

(51) Int. Cl.
*B60H 1/24* (2006.01)
*B60H 1/34* (2006.01)

(52) U.S. Cl.
CPC ... *B60H 1/3421* (2013.01); *B60H 2001/3492* (2013.01)

(58) Field of Classification Search
CPC ................................ B60H 1/34; B60H 1/3421
USPC ........................................................ 454/155
See application file for complete search history.

(56) References Cited

U.S. PATENT DOCUMENTS

| 6,736,719 B1 * | 5/2004 | Gehring | B60H 1/3421 454/143 |
| 2003/0050001 A1 * | 3/2003 | Kamio | B60H 1/345 454/155 |
| 2006/0040606 A1 * | 2/2006 | Park | B60H 1/3428 454/155 |

FOREIGN PATENT DOCUMENTS

| DE | 102009060450 A1 | 6/2011 |
| FR | 2792256 A1 | 10/2000 |
| JP | S57-33511 U | 2/1982 |
| JP | H10-16546 A | 1/1998 |
| JP | 2001-140820 A | 5/2001 |
| JP | 2010-137831 A | 6/2010 |
| JP | 2011-105035 A | 6/2011 |

(Continued)

OTHER PUBLICATIONS

Fukazawa, WO2016021436, "Airflow direction Adjustment device", Feb. 11, 2017.*

(Continued)

Primary Examiner — Grant Moubry
Assistant Examiner — Ryan L Faulkner
(74) Attorney, Agent, or Firm — Oliff PLC

(57) ABSTRACT

A register fixing structure for a vehicle includes a first engaging portion provided at one of an upper portion and a lower portion of the register, or the instrument panel main body; a first engaged portion provided at the other of the upper portion and lower portion of the register or the instrument panel main body, and engaging with the first engaged portion in a vehicle front and rear direction; a second engaging portion provided at one of a side portion at a vehicle width direction outer side of the register or a side panel that is attached at the vehicle width direction outer side of the instrument panel main body; and a second engaged (Continued)

portion provided at the other of the side portion or the side panel, and engaging with the second engaged portion in a vehicle width direction.

3 Claims, 6 Drawing Sheets

(56) References Cited

FOREIGN PATENT DOCUMENTS

JP    WO 2016021436 A1 * 2/2016 ............... B60H 1/34

OTHER PUBLICATIONS

Nov. 29, 2016 Office Action issued in Japanese Patent Application No. 2014-162741.
Mar. 17, 2017 Office Action issued in Chinese Application No. 201510459796.1.

* cited by examiner

REGISTER FIXING STRUCTURE FOR A VEHICLE

CROSS-REFERENCE TO RELATED APPLICATION

This application claims priority under 35 USC 119 from Japanese Patent Application No. 2014-162741 filed Aug. 8, 2014, the disclosure of which is incorporated by reference herein.

BACKGROUND

Technical Field

The present invention relates to a register fixing structure for a vehicle.

Related Art

Japanese Patent Application Laid-Open (JP-A) No. 2001-140820 discloses a technology relating to one-sided clips for attaching a register to an aperture portion in an instrument panel that is assembled at a vehicle body side.

However, in the case of a structure that is fixed to an aperture portion of an instrument panel by clips that are provided at upper and lower faces of the register and engage in a vehicle front and rear direction, it is easy for the register to move up, down, left and right, and particularly in the left and right direction. Consequently, when a vehicle occupant operates the register, there is a risk of the register being moved up, down, left or right, particularly in the left and right direction, by an operation force. Therefore, there is scope for improvement in this regard.

An alternative related technology is disclosed in JP-A No. 2011-105035.

SUMMARY

In consideration of the above, the present invention provides a register fixing structure for a vehicle that improves stiffness after fixing of a register to an instrument panel.

A register fixing structure for a vehicle according to a first aspect of the present invention includes: a register attached to an aperture portion of a front face portion of an instrument panel main body that is provided at a front portion of a vehicle cabin; a first engaging portion provided at one of an upper portion and a lower portion of the register, or the instrument panel main body; a first engaged portion provided at the other of the upper portion and lower portion of the register or the instrument panel main body, the first engaging portion engaging with the first engaged portion in a vehicle front and rear direction; a second engaging portion provided at one of a side portion at a vehicle width direction outer side of the register or a side panel that is attached at the vehicle width direction outer side of the instrument panel main body; and a second engaged portion provided at the other of the side portion at the vehicle width direction outer side of the register or the side panel, the second engaging portion engaging with the second engaged portion in a vehicle width direction.

In the first aspect of the present invention, the upper portion and lower portion of the register are fixed by the first engaging portions engaging in the vehicle front and rear direction with the first engaged portions, and the side portion at the vehicle width direction outer side of the register is fixed by the second engaging portion engaging in the vehicle width direction with the second engaged portion. Thus, engaging directions in which the register is fixed to the instrument panel are the vehicle front and rear direction and the vehicle width direction, which intersect. Therefore, stiffness after the fixing of the register to the instrument panel is improved.

In a register fixing structure for a vehicle according to a second aspect of the present invention, in the first aspect, the first engaging portion is provided at the upper portion and lower portion of the register, the first engaging portion extends in the vehicle front and rear direction from attachment portions that are attached to the upper portion and lower portion of the register, and each first engaging portion includes a one-sided clip that includes a leg piece that engages with the first engaged portion.

In the second aspect of the present invention, the upper portion and lower portion of the register are fixed to the instrument panel main body by the one-sided clips including leg pieces that extend in the vehicle front and rear direction from the attachment portions that are attached to the upper portion and lower portion of the register.

Compared to a two-sided clip with two upper and lower leg pieces, a space for arrangement of each one-sided clip is small in the vehicle upper and lower direction. Therefore, compared to a case of fixing with two-sided clips that include two upper and lower leg pieces, a fixing space for fixing the register to the instrument panel main body is smaller in the vehicle upper and lower direction.

Moreover, although stiffness after fixing of the register is lower than with two-sided clips with two upper and lower leg pieces, in addition to the one-sided clips that engage in the vehicle front and rear direction, the second engaging portion engages with the second engaged portion in the vehicle width direction to fix the side portion at the vehicle width direction outer side of the register to the side panel. Therefore, stiffness after the fixing of the register to the instrument panel is assured.

Thus, even though the fixing space for fixing the register to the instrument panel main body is reduced in the vehicle upper and lower direction, stiffness after the fixing of the register is assured.

In a register fixing structure for a vehicle according to a third aspect of the present invention, in the first aspect, the second engaging portion is provided at the side panel, the second engaging portion extends in a vehicle width direction inner side, and the second engaging portion includes an engaging piece that engages with the second engaged portion.

In the third aspect of the present invention, in a state in which the register is attached to the instrument panel main body, the side panel is attached, moving from the vehicle width direction outer side of the instrument panel main body toward the inner side. Thus, the engaging piece that is provided at the side panel and extends to the vehicle width direction inner side engages in the vehicle width direction with the second engaged portion that is provided at the side portion at the vehicle width direction outer side of the register.

Therefore, even though the engaging directions in which the register is fixed to the instrument panel are the vehicle front and rear direction and the vehicle width direction and intersect, the register is easily attached and fixed to the instrument panel. That is, even though stiffness after the fixing of the register to the instrument panel is improved, the register may be easily attached to the instrument panel.

BRIEF DESCRIPTION OF THE DRAWINGS

Exemplary Embodiments of the present invention will be described in detail based on the following figures, wherein.

DETAILED DESCRIPTION

—Exemplary Embodiment—

Figure 1:
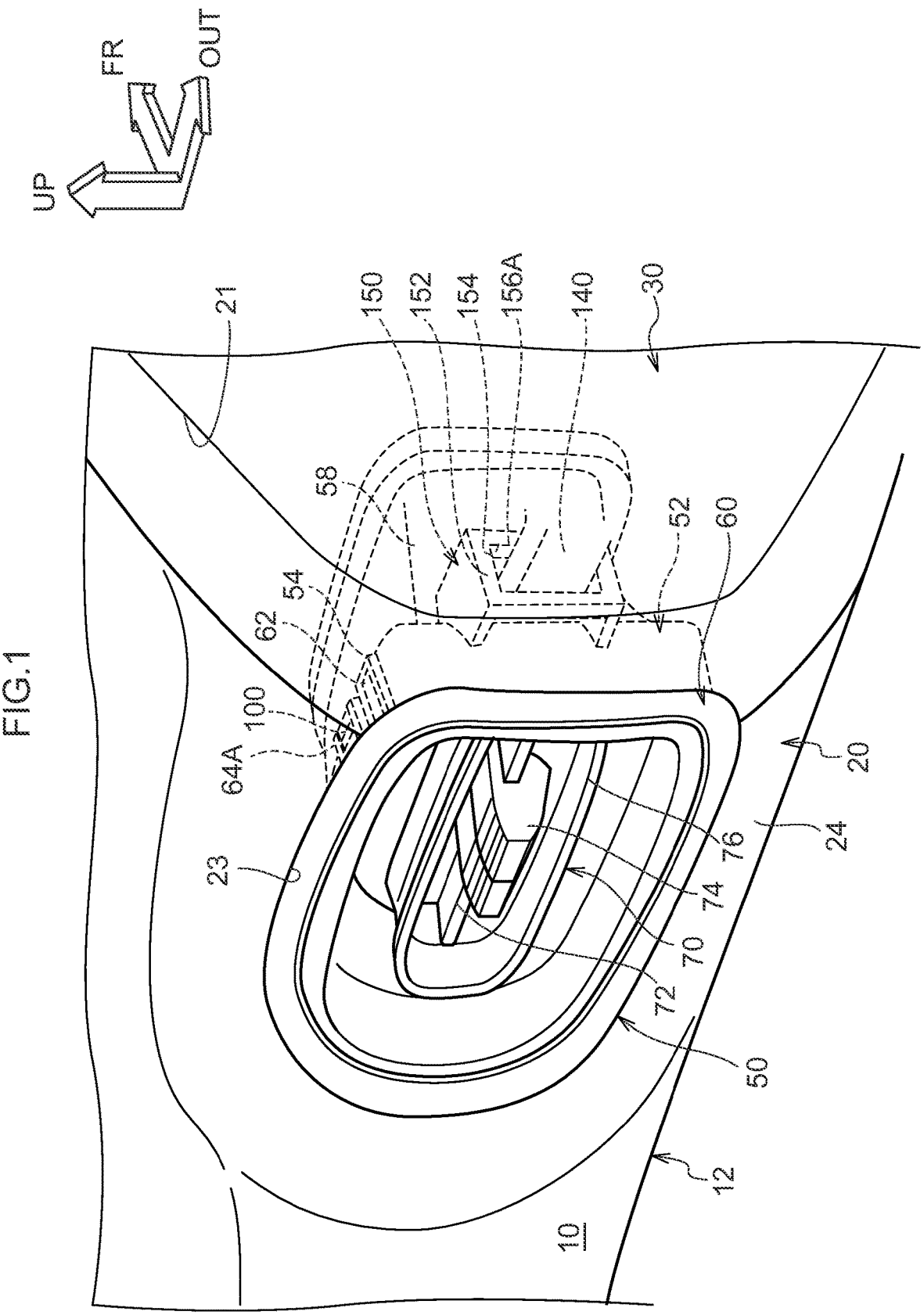
FIG. 1 is a perspective diagram, viewed from a vehicle cabin inner side, of an instrument panel at which a register fixing structure for a vehicle according to an exemplary embodiment of the present invention is employed.

A register fixing structure for a vehicle according to an exemplary embodiment of the present invention is described using FIG. 1 to FIG. 6. An arrow FR that is shown as appropriate in these drawings indicates a vehicle front and rear direction forward side, an arrow UP indicates a vehicle upper and lower direction upward side, and an arrow OUT indicates a vehicle width direction outer side. Only the vehicle width direction right side is shown in the drawings. However, the vehicle width direction left side has the same structures apart from being symmetrical between left and right.

—The Register Fixing Structure for a Vehicle—

As shown in FIG. 1, an instrument panel 12 fabricated of resin is provided at a front portion of a vehicle cabin 10, and the instrument panel 12 is attached to an instrument panel reinforcement that spans between left and right front pillars, which are not shown in the drawings. The instrument panel 12 includes an instrument panel main body 20 and side panels 30. Each side panel 30 is attached at a vehicle width direction outer side of the instrument panel main body 20 so as to cover a vehicle width direction outer side aperture region 21 of the instrument panel main body 20 (see FIG. 5).

The instrument panel 12 according to the present exemplary embodiment is a thin-form instrument panel in which a front face portion 24 that bulges to the side of the instrument panel main body 20 at which the vehicle cabin 10 is disposed (the vehicle rearward side) is small in the vehicle upper and lower direction. In the present exemplary embodiment, the instrument panel 12 is formed in a thin form because an air conditioning device (HVAC: heating, ventilation, and air conditioning) is disposed at a vehicle forward side of the instrument panel reinforcement, which is not shown in the drawings, and an airbag device is disposed at the vehicle rearward side.

Figure 2:
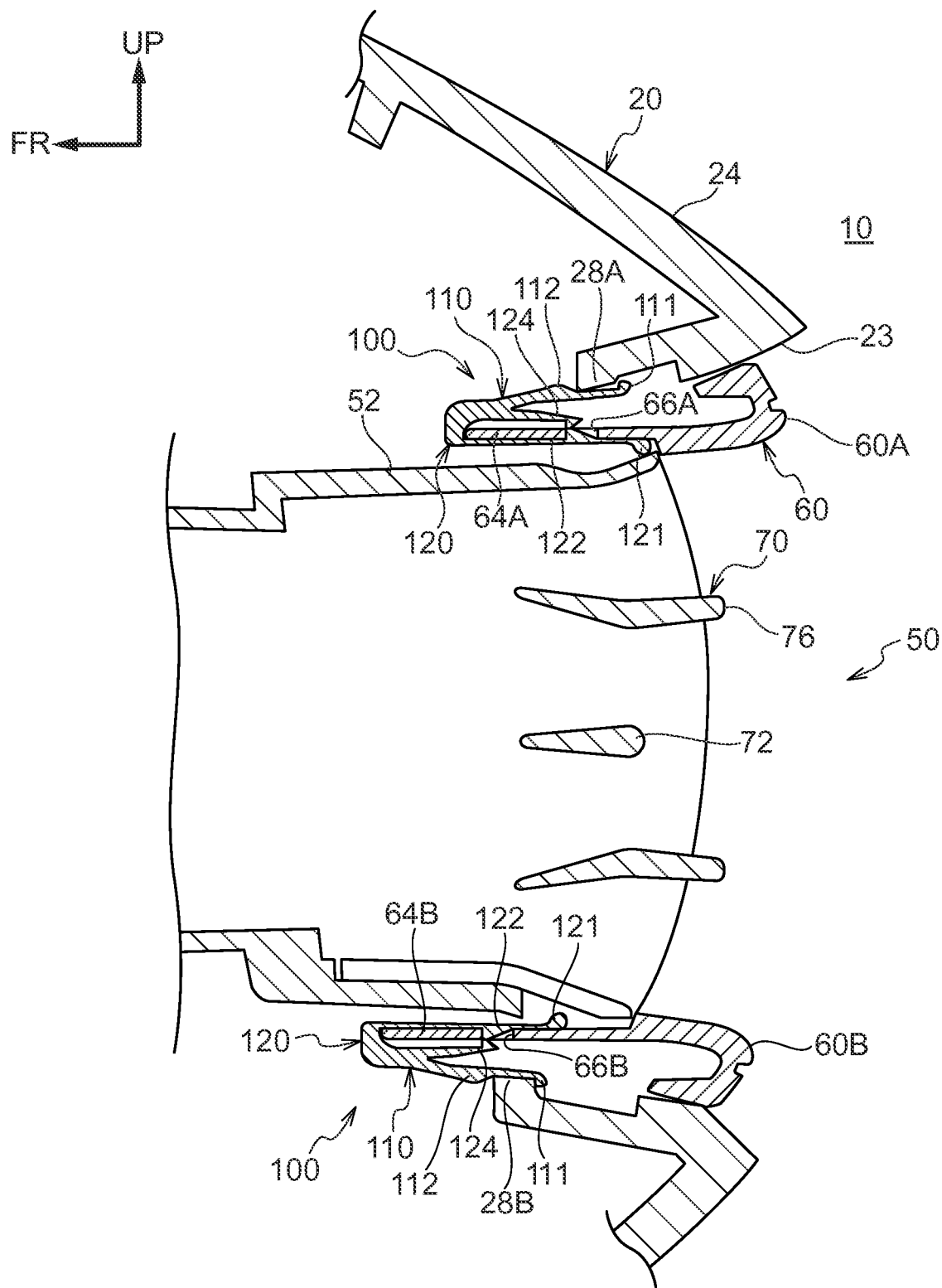
FIG. 2 is a vertical sectional diagram taken along a vehicle front and rear direction through one-sided clips of the instrument panel of FIG. 1.

As shown in FIG. 1 and FIG. 2, a side register aperture portion 23 is formed at each vehicle width direction outer side of the front face portion 24 of the instrument panel main body 20. A side register for air conditioning 50 is attached to the side register aperture portion 23. The side register 50 is connected to an air conditioning device, which is not shown in the drawings, and blows out air whose temperature is regulated by the air conditioning device.

As shown in FIG. 1 to FIG. 4, the side register 50 includes a register main body 52 and a bezel 60. The register main body 52 has a substantially rectangular tube shape in an elevation view.

As shown in FIG. 1 and FIG. 2, a near side flow-straightening portion 70 is provided inside the register main body 52 at the side thereof at which the vehicle cabin 10 is disposed (the vehicle front and rear direction rear side). The near side flow-straightening portion 70 is structured by a horizontal fin 72, at which an operation portion 74 is provided (see FIG. 1), and a frame portion 76.

Figure 3:
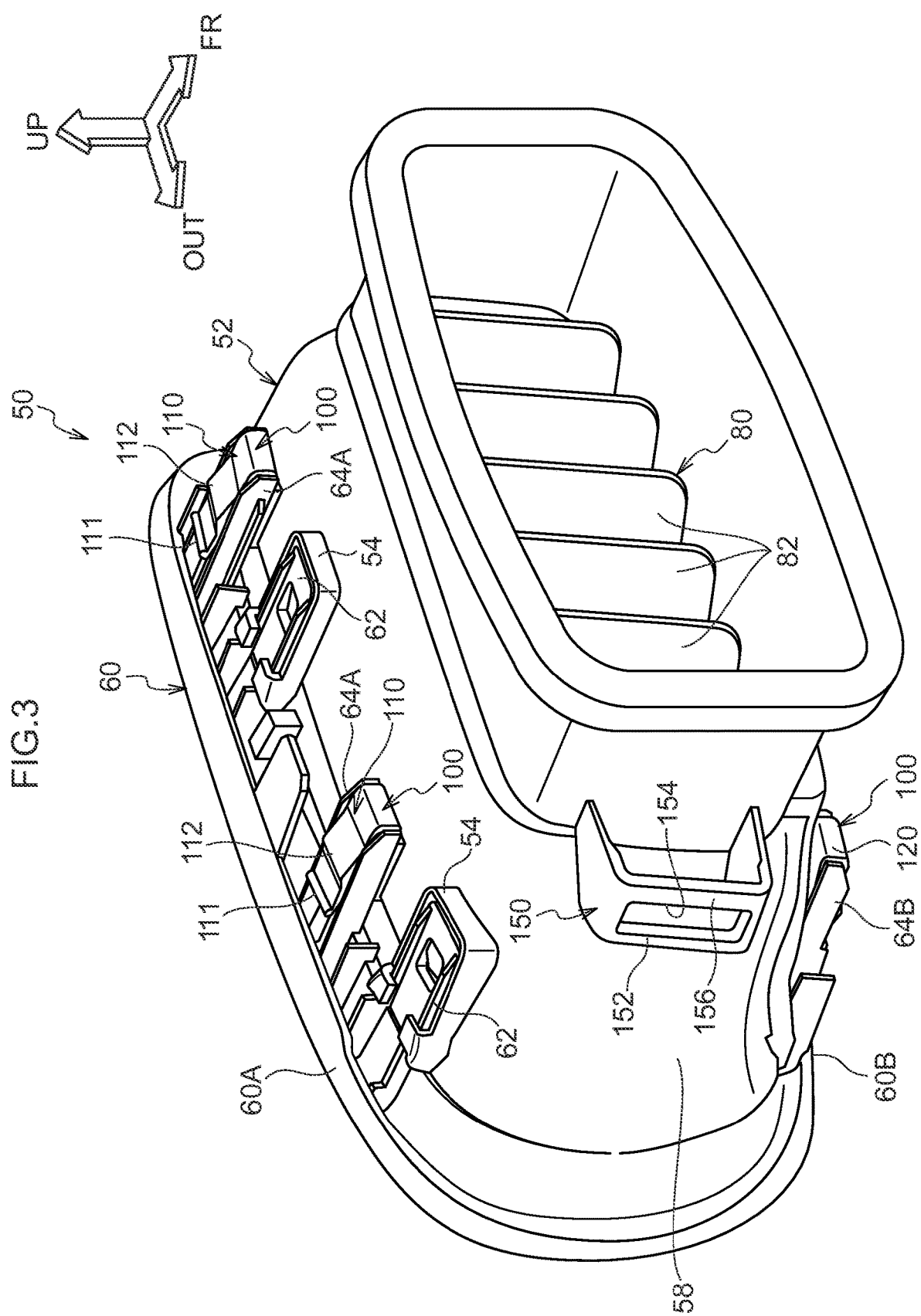
FIG. 3 is a perspective diagram in which a side register is viewed from the vehicle forward side.

As shown in FIG. 3, a far side flow-straightening portion 80 is provided at the further side (the vehicle front and rear direction front side) of the near side flow-straightening portion 70 (see FIG. 1 and FIG. 2). The far side flow-straightening portion 80 includes plural vertical fins 82 that are linked by a horizontal member, which is not shown in the drawings.

When a vehicle occupant operates the operation portion 74 shown in FIG. 1, an upper and lower direction angle of the near side flow-straightening portion 70 and a left and right direction angle of the far side flow-straightening portion 80 (see FIG. 3) are altered. Thus, the vehicle occupant may adjust a blowing-out direction of the air that is sent from the air conditioning device that is not shown in the drawings.

As shown in FIG. 1 to FIG. 4, the bezel 60 is attached to the side of the register main body 52 at which the vehicle cabin 10 is disposed (the vehicle front and rear direction rear side).

Figure 4:
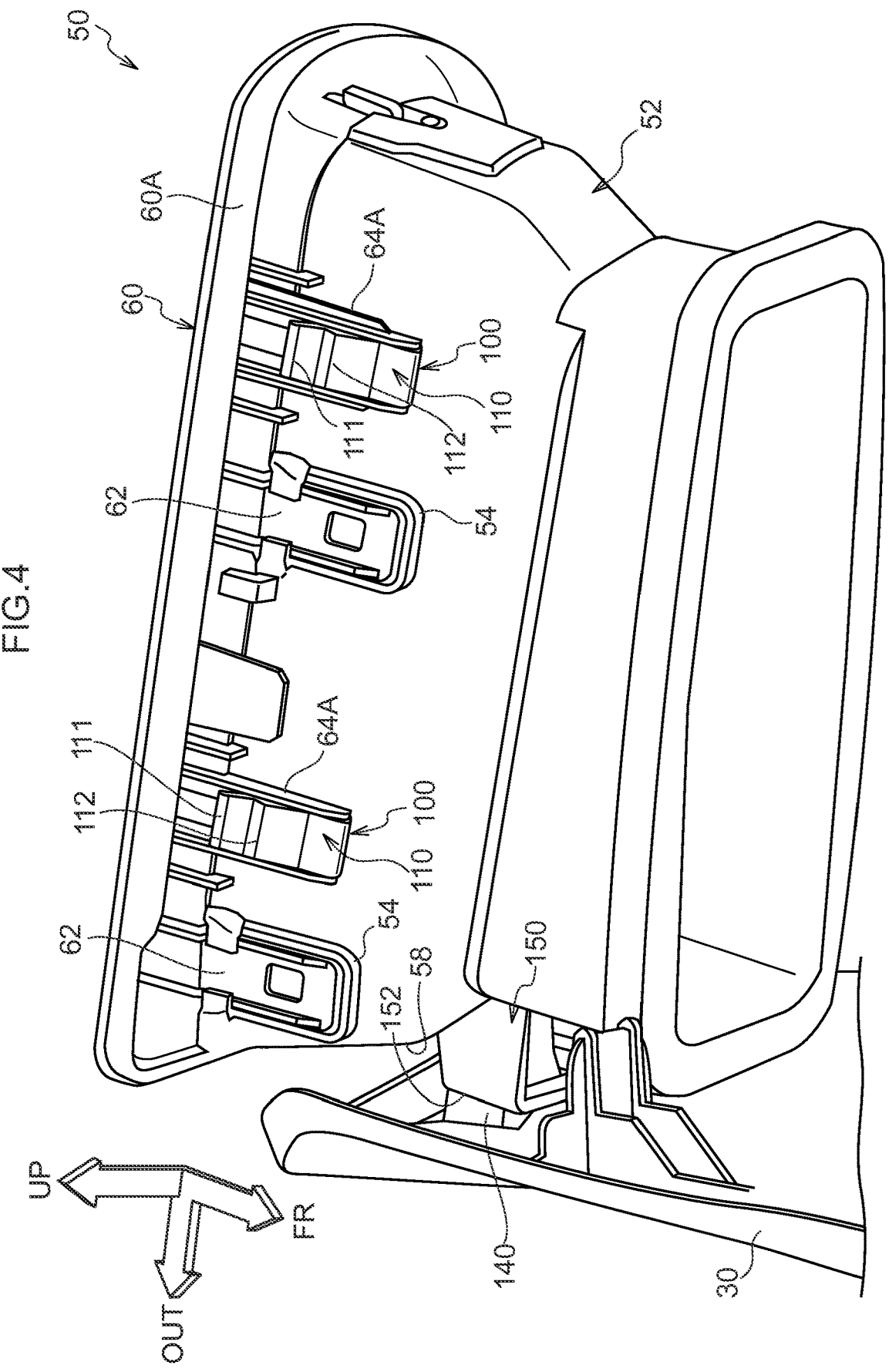
FIG. 4 is a perspective diagram in which a side panel and a side register are viewed from diagonally upward from the vehicle forward side.

As shown in FIG. 2 to FIG. 4, plural (two in the present exemplary embodiment) joining piece portions 62 (see FIG. 3 and FIG. 4) and plural (two in the present exemplary embodiment) attachment piece portions 64A and 64B (see FIG. 2 and FIG. 4) are provided at an upper portion 60A and a lower portion 60B, respectively, of the bezel 60 (see FIG. 2 and FIG. 3). The joining piece portions 62 and attachment piece portions 64A and 64B protrude to the vehicle forward side and are spaced apart in the vehicle width direction. The joining piece portions 62 at the lower portion 60B of the bezel 60 are not illustrated in these drawings but a plural number of the joining piece portions 62 (two in the present exemplary embodiment) at the lower portion 60B are similarly provided as those at the upper portion 60A.

As shown in FIG. 3 and FIG. 4, each joining piece portion 62 is inserted into and engaged with an engaged portion 54 that is provided at the register main body 52. Thus, the bezel 60 and the register main body 52 are engaged and made integral. The engaged portions 54 at the lower side are not shown in the drawings, but the engaged portions 54 at the lower side are similarly provided as those at the upper side and the joining piece portions 62 are also inserted and engaged thereat.

Figure 6:
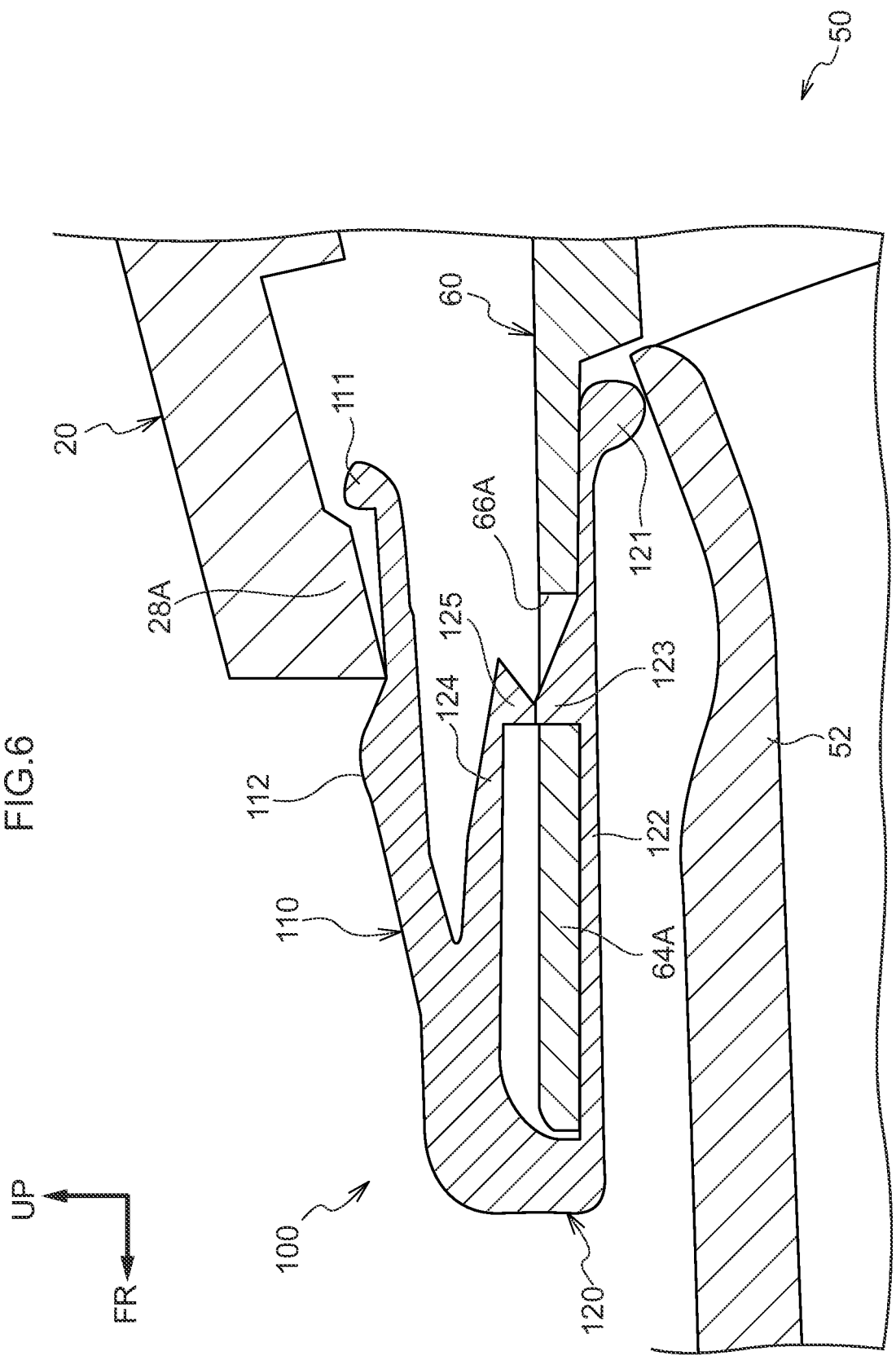
FIG. 6 is a magnified vertical sectional diagram of principal portions in FIG. 2.

As shown in FIG. 2 to FIG. 4 and FIG. 6, respective one-sided clips 100 are attached to the plural attachment piece portions 64A at the upper side and the plural attachment piece portions 64B at the lower side. As shown in FIG. 2 and FIG. 6, each one-sided clip 100 includes an attachment portion 120 and a leg piece 110, which extends to the vehicle front and rear direction rear side from the attachment portion 120. This one-sided clip 100 is a clip that includes the leg piece 110 only at one side. Hereinafter, where directions of the one-sided clips 100 are described, unless particularly specified, the state in which the one-sided clips 100 are attached to the attachment piece portions 64A or 64B is described.

As shown in FIG. 6, the attachment portion 120 of each one-sided clip 100 includes a first engaging piece 122 and a second engaging piece 124, which are structured in a substantial "V" shape in a side view. The first engaging piece 122 is longer than the second engaging piece 124, which is disposed at the side of the first engaging piece 122 at which the instrument panel main body 20 is disposed. An increased thickness portion 121 is formed at a distal end portion of the first engaging piece 122. The increased thickness portion 121 is disposed at the side of the first engaging piece 122 at which the register main body 52 is disposed and, in a sectional view, is formed in a substantially circular shape that protrudes to the side at which the register main body 52 is disposed. A first projection portion 123 and a second projection portion 125 are formed in triangular shapes in sectional view, so as to oppose one another, at the first engaging piece 122 and the second engaging piece 124, respectively.

When each attachment piece portion 64A of the bezel 60 is inserted between the first engaging piece 122 and second engaging piece 124 of the attachment portion 120 of the respective one-sided clip 100, the first projection portion 123 and second projection portion 125 engage with an anchoring hole 66A in the attachment piece portion 64A. Thus, the one-sided clip 100 is attached to the attachment piece portion 64A of the bezel 60.

Similarly, as shown in FIG. 2, when each attachment piece portion 64B at the lower side of the bezel 60 is inserted between the first engaging piece 122 and second engaging piece 124 of the attachment portion 120 of the respective one-sided clip 100, the first projection portion 123 and second projection portion 125 (see FIG. 6) engage with an anchoring hole 66B in the attachment piece portion 64B. Thus, the one-sided clip 100 is attached to the attachment piece portion 64B of the bezel 60.

As shown in FIG. 2 and FIG. 6, the leg piece 110 of each one-sided clip 100 extends to the vehicle front and rear direction rear side from the attachment portion 120. As shown in FIG. 2 to FIG. 4 and FIG. 6, an increased thickness portion 111 is formed at a distal end portion of the leg piece 110. In a sectional view, the increased thickness portion 111 is formed in a substantially circular shape that protrudes to the side at which the instrument panel main body 20 is disposed. Further, an engaging protrusion portion 112 is formed at an extension direction middle portion of the leg piece 110. The engaging protrusion portion 112 has a substantially triangular shape that protrudes to the side at which the instrument panel main body 20 is disposed.

As shown in FIG. 2, the one-sided clips 100 at the upper side are attached to the attachment piece portions 64A such that each engaging protrusion portion 112 thereof protrudes to the vehicle upper and lower direction upper side (see FIG. 6). The one-sided clips 100 at the lower side are attached to the attachment piece portions 64B such that each engaging protrusion portion 112 thereof protrudes to the vehicle upper and lower direction lower side.

As shown in FIG. 2, protrusion portions 28A and 28B are formed at distal end portions of outer edge regions of the side register aperture portion 23. The protrusion portions 28A and 28B protrude to the sides thereof at which the side register 50 is disposed. The engaging protrusion portions 112 of the leg pieces 110 of the one-sided clips 100 that are attached to the attachment piece portions 64A and 64B of the bezel 60 of the side register 50 engage with the protrusion portions 28A and 28B of the side register 50 (See FIG. 6).

As shown in FIG. 1, FIG. 3 and FIG. 4, an engaged portion 150 is formed at a side face portion 58 at the vehicle width direction outer side of the register main body 52 of the side register 50.

As shown in FIG. 3, the shape of the engaged portion 150 as viewed from the vehicle rearward side is a horizontally oriented substantial "U" shape. As shown in FIG. 1 and FIG. 3, an engaging aperture portion 154 is formed in a side wall 152 at the vehicle width direction outer side of the engaged portion 150. The engaging aperture portion 154 penetrates through the side wall 152 in the vehicle width direction. That is, seen from the vehicle width direction outer side, the side wall 152 has a frame shape.

As shown in FIG. 1, an engaging piece 140 is formed at the side panel 30 that covers the aperture region 21 at the vehicle width direction outer side of the instrument panel main body 20. The engaging piece 140 extends to the vehicle width direction inner side (see FIG. 4 and FIG. 5).

Figure 5:
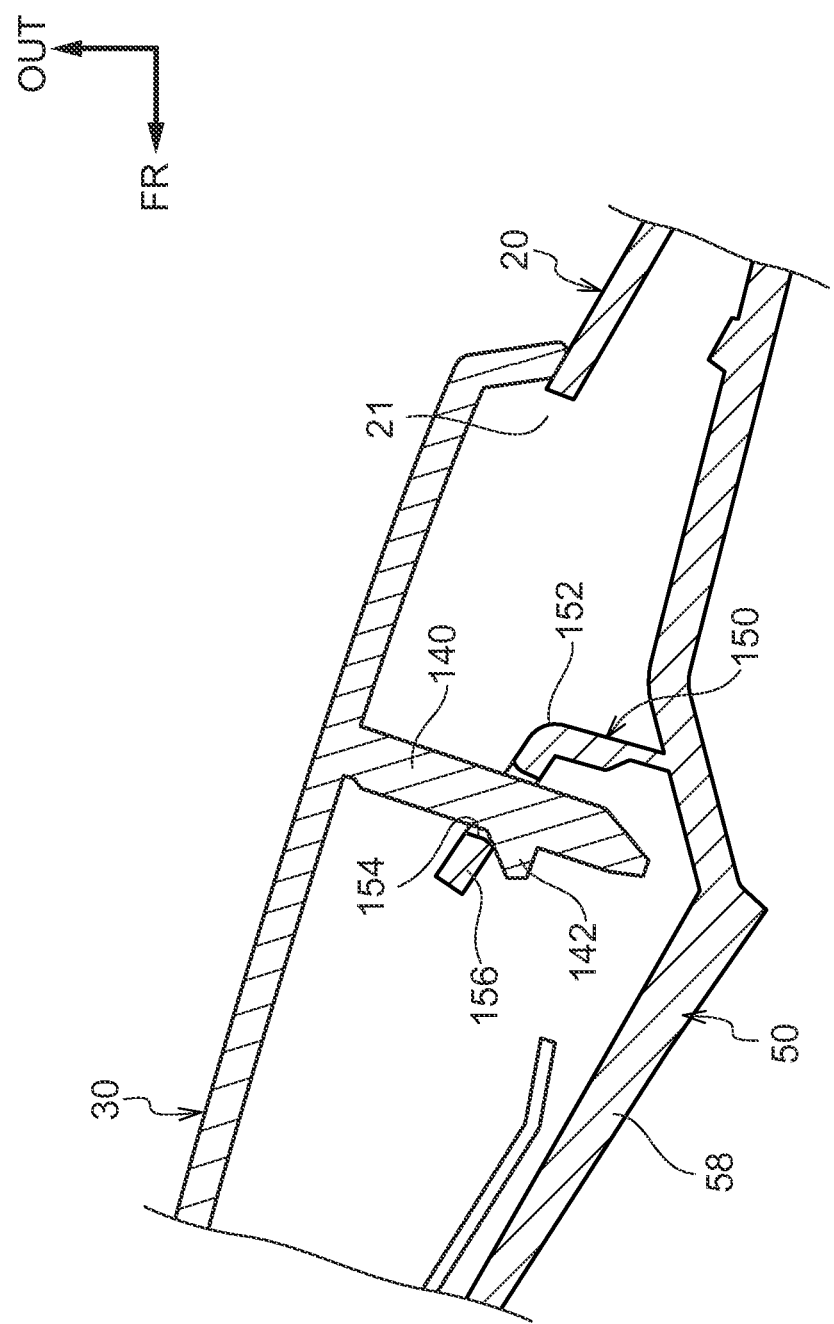
FIG. 5 is a magnified horizontal sectional diagram taken along a vehicle width direction through an engaging piece of the instrument panel of FIG. 1.

As shown in FIG. 5, a pawl portion 142 is formed at a distal end portion of the engaging piece 140. The pawl portion 142 protrudes to the vehicle front and rear direction front side. The engaging piece 140 of the side panel 30 is inserted into the engaging aperture portion 154 of the engaged portion 150 formed at the side face portion 58 of the register main body 52 and the pawl portion 142 engages with a front side outer edge portion 156 of the engaging aperture portion 154 (see FIG. 1 and FIG. 3) (see FIG. 4).

—Fixing Method of the Side Register—

Now, an example of a fixing method of the side register 50 is described.

As shown in FIG. 1, FIG. 2 and the like, the engaging protrusion portions 112 of the leg pieces 110 of the one-sided clips 100 are engaged with the protrusion portions 28A and 28B at the outer edge regions of the side register aperture portion 23 by the one-sided clips 100 being attached to the attachment piece portions 64A and 64B of the side register 50 and the side register 50 being fitted into the side register aperture portion 23 of the instrument panel main body 20 (see FIG. 6).

Then, as shown in FIG. 4 and FIG. 5, by the side panel 30 being attached to the instrument panel main body 20, moving from the vehicle width direction outer side toward the inner side, the engaging piece 140 of the side panel 30 is inserted into the engaging aperture portion 154 of the engaged portion 150 formed at the side face portion 58 of the register main body 52 of the side register 50, and the pawl portion 142 engages with the front side outer edge portion 156.

Thus, the side register 50 is attached to the instrument panel 12 and fixed.

—Operation and Effects—

Now, operation and effects of the present exemplary embodiment are described. The engaging protrusion portions 112 of the leg pieces 110 of the one-sided clips 100 attached to the attachment piece portions 64A and 64B of the upper portion 60A and lower portion 60B (of the bezel 60) of the side register 50 engage in the vehicle front and rear direction with the protrusion portions 28A and 28B at the outer edge regions of the side register aperture portion 23.

In addition, the engaging piece 140 of the side panel 30 is inserted into the engaging aperture portion 154 of the engaged portion 150 formed at the side face portion 58 of the register main body 52 of the side register 50, and the pawl portion 142 of the engaging piece 140 engages in the vehicle width direction with the front side outer edge portion 156 of the engaging aperture portion 154.

Thus, engagement directions in which the side register 50 is fixed to the instrument panel 12 are the vehicle front and rear direction (by the one-sided clips 100) and the vehicle width direction (by the engaging piece 140), which intersect (are orthogonal). Therefore, stiffness after the fixing of the side register 50 to the instrument panel 12 (after attachment) is improved.

Hence, when a vehicle occupant operates the operation portion 74 in order to adjust the blowing-out direction of the air sent from the air conditioning device, which is not shown in the drawings, movement of the side register 50 as a whole by the operation force is prevented or suppressed. To describe this from another perspective, when the vehicle occupant operates the operation portion 74, movement of the side register 50 as a whole and a sensation of awkwardness for the vehicle occupant are prevented or suppressed.

Spaces for arrangement in the vehicle upper and lower direction of the one-sided clips 100 attached to the attachment piece portions 64A and 64B of the side register 50 are smaller than for two-sided clips that have two upper and lower leg pieces. Therefore, a fixing space in the vehicle upper and lower direction for fixing the side register 50 to the instrument panel main body 20 is smaller. Consequently, the vehicle upper and lower direction width of the instrument panel 12 may be reduced (narrowed) while the vehicle upper and lower direction width of the side register 50 (the area through which air-conditioned air is blown out (the register capacity)) is assured.

The one-sided clips 100 have lower stiffness after the fixing of the side register 50 (after attachment) than two-sided clips that would have two upper and lower leg pieces. However, as described above, the pawl portion 142 of the engaging piece 140 of the side panel 30 engages in the vehicle width direction with the front side outer edge portion 156 of the engaged portion 150 of the side register 50. Therefore, stiffness after the fixing of the side register 50 is assured.

Therefore, even when the instrument panel 12 has a thin form in which the front face portion 24 is narrow in the vehicle upper and lower direction as in the present exemplary embodiment, both stiffness after the fixing of the side register 50 to the instrument panel 12 and the width of the side register 50 in the vehicle upper and lower direction (the area through which air-conditioned air is blown out (the register capacity)) may be assured.

In the state in which the side register 50 has been attached to the instrument panel main body 20, the side panel 30 is attached from the vehicle width direction outer side of the instrument panel main body 20 toward the inner side. Thus, the engaging piece 140 extending to the vehicle width direction inner side that is provided at the side panel 30 engages with the engaged portion 150 of the side register 50 in the vehicle width direction.

Therefore, even though the engagement directions in which the side register 50 is fixed are the vehicle front and rear direction (by the one-sided clips 100) and the vehicle width direction (by the engaging piece 140) and intersect (are orthogonal), the side register 50 is easily attached to the instrument panel 12 and fixed.

Furthermore, as long as the side panel 30 that structures the instrument panel 12 is not detached, the side register 50 will not detach from the instrument panel 12. In other words, detachment of the side register 50 is prevented.

—Alternative Modes—

The present invention is not limited by the exemplary embodiment described above.

For example, the above exemplary embodiment has a structure in which the one-sided clips 100 that are attached to the upper portion 60A and lower portion 60B (of the bezel 60) of the side register 50 engage with the instrument panel main body 20 in the vehicle front and rear direction, but this is not limiting. For example, a structure is possible in which the one-sided clips 100 are attached to the instrument panel main body 20 and engage with the side register 50 in the vehicle front and rear direction. Further, structures are possible in which the upper portion 60A and lower portion 60B of the side register 50 are fixed at the instrument panel main body 20 by clips, engaging members or the like other than the one-sided clips 100. That is, it is sufficient to form a structure in which the first engaging portions that are provided at one of the register, at the upper portion and lower portion thereof, or the instrument panel main body engage in the vehicle front and rear direction with the first engaged portions that are provided at the other of the upper portion and lower portion of the register or the instrument panel main body.

As another example, the above exemplary embodiment has a structure in which the engaging piece 140 of the side panel 30 is inserted into the engaging aperture portion 154 of the engaged portion 150 formed at the side face portion 58 of the register main body 52 of the side register 50 and the pawl portion 142 engages with the front side outer edge portion 156 in the vehicle width direction, but this is not limiting. For example, the engaging piece 140 may be provided at the side register 50 and the engaged portion 150 may be provided at the side panel 30. Further, structures are possible in which the side panel 30 and the side register 50 are fixed by structures other than the engaging piece 140 and the engaged portion 150. That is, it is sufficient to form a structure in which the second engaging portion that is provided at one of the side portion at the vehicle width direction outer side of the register or the side panel is a structure that engages in the vehicle width direction with the second engaged portion that is provided at the other of the side portion at the vehicle width direction outer side of the register or the side panel.

Herein, the first engaging portion and the first engaged portion engage in the vehicle front and rear direction. However, this engaging direction need not completely coincide with the vehicle front and rear direction. The engaging direction may be angled a little relative to the vehicle front and rear direction. Similarly, although the second engaging portion and the second engaged portion engage in the vehicle width direction, this engaging direction need not completely coincide with the vehicle width direction and the engaging direction may be angled a little relative to the vehicle width direction. Incidentally, in the exemplary embodiment described above, as can be seen in FIG. 5, the engaging direction of the engaging piece 140 with the engaged portion 150 is angled a little relative to the vehicle width direction.

It will also be clear that numerous modes may be embodied within a scope not deviating from the gist of the present invention.

What is claimed is:

1. A register fixing structure for a vehicle, comprising:
   a register attached to an aperture portion of a front face portion of an instrument panel main body that is provided at a front portion of a vehicle cabin;
   a clip provided at one of (1) a portion of the register, or (2) the instrument panel main body;
   a protrusion portion provided at an other of the portion of the register or the instrument panel main body, the clip engaging with the protrusion portion at a portion extending along a vehicle front and rear direction;
   an engaging piece provided at a side panel that is attached at a vehicle width direction outer side of the instrument panel main body; and
   an engaged portion provided at a side portion at the vehicle width direction outer side of the register, the engaging piece engaging with the engaged portion at a portion extending along a vehicle width direction, the vehicle width direction intersecting with the vehicle front and rear direction, wherein the engaging piece includes a pawl portion that engages in the vehicle width direction with a front side outer edge portion of an engaging aperture portion of the engaged portion, the engaging piece extends in the vehicle width direction, and the pawl portion protrudes from a distal end portion of the engaging piece in the vehicle front and rear direction.

2. The register fixing structure for a vehicle according to claim 1, wherein the clip is a plurality of clips, one of the clips provided at an upper portion and an other of the clips provided at a lower portion of the register, each clip extends along the vehicle front and rear direction from attachment portions that are respectively attached to the upper portion and lower portion of the register, and each clip includes a one-sided clip that includes a leg piece that engages with the protrusion portion.

3. The register fixing structure for a vehicle according to claim 1, wherein the engaging piece extends in toward a vehicle inner side along the vehicle width direction.

\* \* \* \* \*